(12) United States Patent
Wang et al.

(10) Patent No.: US 9,109,677 B2
(45) Date of Patent: Aug. 18, 2015

(54) DRIVE UNIT (71) Applicant: Johnson Electric S.A., Murten (CH)

(72) Inventors: Yue Wang, Shenzhen (CN); Xing Ju Yi, Shenzhen (CN); Guo Ping Zhang, Shenzhen (CN); Xiao Hui Wang, Shenzhen (CN); Hong Yu Ding, Shenzhen (CN); Jing Ning Ta, Hong Kong (CN); Dennis Francis Gorosin, Hong Kong (CN)

(73) Assignee: JOHNSON ELECTRIC S.A., Murten (CH)

(*) Notice: Subject to any disclaimer, the term of this patent is extended or adjusted under 35 U.S.C. 154(b) by 132 days.

(21) Appl. No.: 13/864,625

(22) Filed: Apr. 17, 2013

(65) Prior Publication Data
US 2013/0269305 A1 Oct. 17, 2013

(30) Foreign Application Priority Data
Apr. 17, 2012 (CN) .......................... 2012 1 0112252

(51) Int. Cl.
| F16H 57/08 | (2006.01) |
| F16H 25/20 | (2006.01) |
| A01D 34/00 | (2006.01) |
| F16H 1/28 | (2006.01) |
| A01D 34/78 | (2006.01) |
| F16H 1/46 | (2006.01) |
| F16H 57/033 | (2012.01) |
| E05F 15/622 | (2015.01) |

(52) U.S. Cl.
CPC .............. *F16H 25/20* (2013.01); *A01D 34/00* (2013.01); *A01D 34/78* (2013.01); *F16H 1/28* (2013.01); *F16H 1/46* (2013.01); *E05F 15/622* (2015.01); *E05Y 2201/72* (2013.01); *E05Y 2900/546* (2013.01); *F16H 57/033* (2013.01); *Y10T 74/18576* (2015.01)

(58) Field of Classification Search
CPC ............. F16H 25/20; F16H 1/28; F16H 1/46; F16H 57/033; F16H 57/08
USPC ......................................................... 475/331
See application file for complete search history.

(56) References Cited

U.S. PATENT DOCUMENTS

| 8,376,901 | B2 | 2/2013 | Riester et al. | |
| 2002/0065171 | A1* | 5/2002 | Raber ........................... | 477/175 |
| 2009/0062058 | A1* | 3/2009 | Kimes et al. ................... | 475/344 |
| 2009/0176615 | A1* | 7/2009 | Gasparrini et al. ............ | 475/331 |
| 2010/0056321 | A1* | 3/2010 | Snyder et al. .................. | 475/331 |
| 2010/0261572 | A1* | 10/2010 | Riester et al. ................. | 475/331 |
| 2010/0292043 | A1* | 11/2010 | Tao et al. ....................... | 475/344 |
| 2011/0251010 | A1* | 10/2011 | Grimm ........................... | 475/159 |
| 2013/0274049 | A1* | 10/2013 | Zhu et al. ....................... | 475/149 |

FOREIGN PATENT DOCUMENTS

DE 10251499 5/2004

* cited by examiner

*Primary Examiner* — David J Hlavka
(74) *Attorney, Agent, or Firm* — Muncy, Geissler, Olds & Lowe, P.C.

(57) ABSTRACT

The planetary gear train includes a first sun gear driven by the motor, a first ring gear, a first carrier, and a plurality of first planetary gears arranged at one side of the first carrier and meshing with the first sun gear and the first ring gear. The first sun gear, first planetary gears and first ring gear are helical gears so that meshing surface is increased. Helical teeth formed on an inner surface of the first ring gear mesh with the helical teeth of the first planetary gears. Therefore, the operation is stable and the noise is low. The planetary gears are made of plastic to further decrease the noise. The first ring gear is made by sintered powder metallurgy.

19 Claims, 7 Drawing Sheets

DRIVE UNIT

CROSS REFERENCE TO RELATED APPLICATIONS

This non-provisional patent application claims priority under 35 U.S.C. §119(a) from Patent Application No. 201210112252.4 filed in The People's Republic of China on Apr. 17, 2012.

FIELD OF THE INVENTION

This invention generally relates to a drive unit, and in particular, to a drive unit comprising a planetary gear train.

BACKGROUND OF THE INVENTION

Drive units are widely used in many applications, such as electric mowers and powered lift gates. The drive unit used in an electric mower generally comprises a motor and a gear reduction unit. The gear reduction unit generally emits great noise in high speed operating conditions. Such noise is often considered as noise pollution. In other applications involving lower operating speeds, the noise is not as great but may still be too loud where quiet operation is desired, such as in the drive units for powered lift gates in passenger vehicles.

SUMMARY OF THE INVENTION

Hence there is a desire for quieter drive units.

Accordingly, in one aspect thereof, the present invention provides a drive unit comprising: a motor having a motor shaft; an output; and a planetary gear train connecting the motor shaft to the output, comprising a first sun gear driven by the motor, a first ring gear, a first carrier, and a plurality of first planetary gears rotatably supported by and arranged at one side of the first carrier and meshing with the first sun gear and the first ring gear, wherein the first sun gear and the first planetary gears are helical gears having helical teeth and helical teeth are formed on an inner surface of the first ring gear and mesh with the helical teeth of the first planetary gears.

Preferably, the first ring gear is made by sintered powder metallurgy.

Preferably, the planetary gear train comprises a second ring gear connected to the first ring gear, and a quick aligning structure that extends in the axial direction of the motor is formed between the first and second ring gears.

Preferably, a connecting piece is provided for fixing the planetary gear train to the motor.

Preferably, the drive unit further comprises a mounting piece for holding a bearing; and a plurality of fasteners that passes through the mounting piece, the second ring gear, the first ring gear and the connecting piece to fasten them together.

Preferably, another quick aligning structure that extends in the axial direction of the motor is formed between the connecting piece and the first ring gear.

Preferably, the first ring gear comprises notches formed in both axial ends of the first ring gear; and the connecting piece and the second ring gear have bosses that mate with the notches.

Preferably, connecting rings are formed at both axial ends of the first ring gear; the connecting rings surround a flange portion of the connecting piece and a flange portion of the second ring gear respectively; radial fitting holes are formed in the connecting rings and the flange portions; and fasteners are respectively disposed in the corresponding fitting holes to fasten the first ring gear to the connecting piece and the second ring gear.

Preferably, the first ring gear comprises a connecting ring formed in one end of the first ring gear; the second ring gear comprises a flange portion surrounded by the connecting ring; a radially convex axial locating surface is formed on one of the inner surface of the connecting ring and the flange portion; and a radially concave axial locating surface is formed on the other of the inner surface of the connecting ring and the flange portion, to mate with the convex axial locating surface.

In another aspect thereof, the present invention provides a mower comprising: a main body; wheels and cutting tools arranged at a lower portion of the main body; and a drive unit as described above, mounted on the main body, wherein the output of the drive unit is coupled to at least one of the wheels to drive the mower.

In a further aspect thereof, the present invention provides a powered strut for operating a lift gate in a vehicle, comprising: a drive unit as described above; a housing accommodating the drive unit; mounts for fixing the strut to the vehicle; a runner rotatably mounted to the housing and driven by the output of the drive unit and having an internally threaded central hole; a spindle threadingly engaged with the central hole of the runner and fixed to one of the mounts and movable through the runner between a contracted position and an extended position, by rotation of the runner; and a spring urging the strut towards the extended position.

In embodiments of the present invention, the first sun gear, first planetary gears and first ring gear are helical gears so that meshing surface is increased. Therefore, the operation is stable and the noise is low. The planetary gears are made of plastic to further decrease the noise. The first ring gear is made by sintered powder metallurgy to save cost and enhance the manufacturability.

BRIEF DESCRIPTION OF THE DRAWINGS

Various embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Referring to FIGS. 1 to 6, a drive unit according to a first preferred embodiment of the present invention comprises a motor 10, a reduction planetary gear train 30, and a connecting piece 50 for fixing the planetary gear train 30 to the motor 10. Preferably, the motor 10 is a brushless direction current (BLDC) motor. It is contemplated that the motor 10 may be other types of motors.

Figure 1:
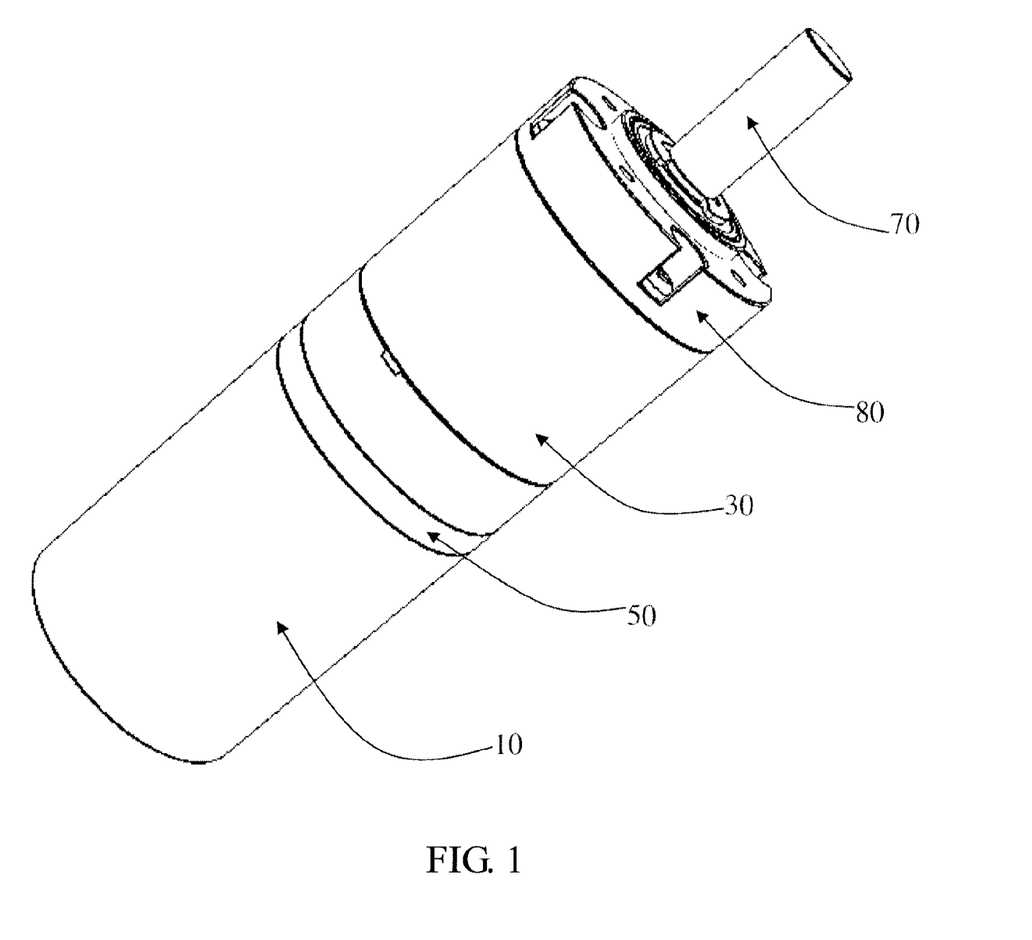
FIG. 1 illustrates a drive unit according to a first exemplary embodiment of the present invention.
Figure 2:
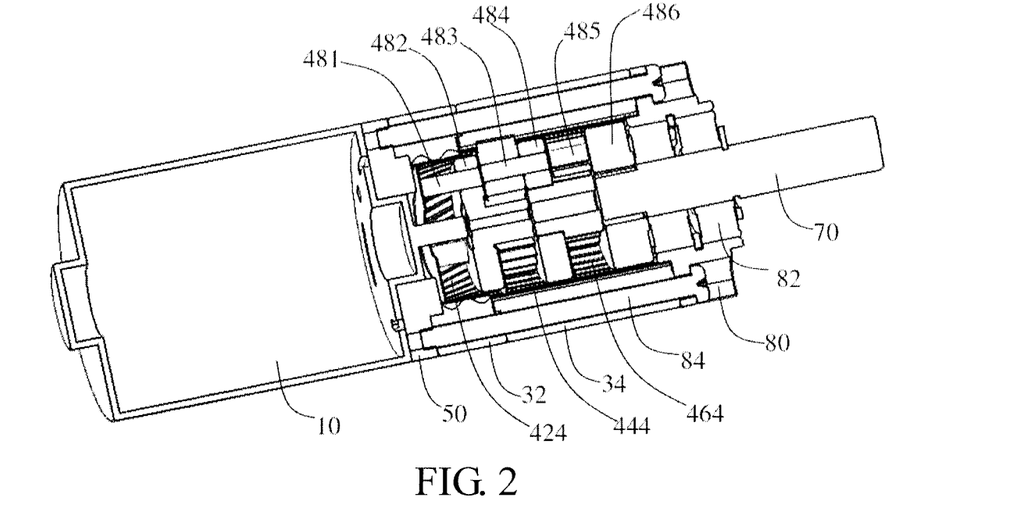
FIG. 2 is a sectional view of the drive unit shown in FIG. 1.
Figure 3:
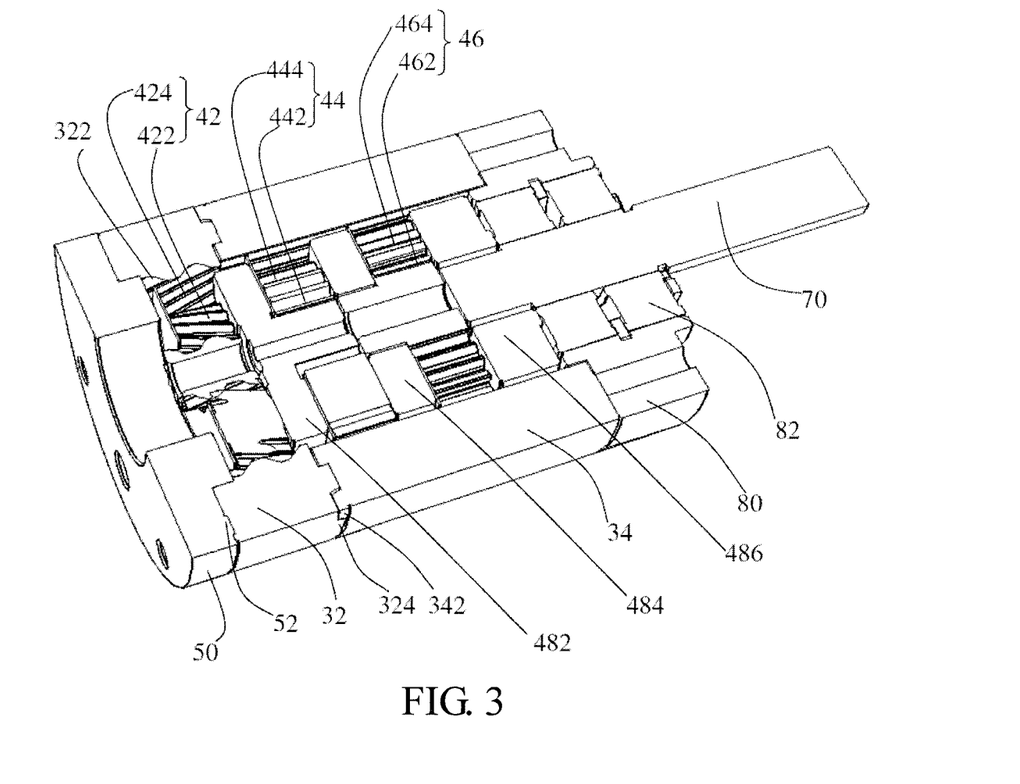
FIG. 3 is an enlarged sectional view of a planetary gear train of the drive unit shown in FIG. 1.

The planetary gear train 30 comprises a first ring gear 32 and a second ring gear 34 that forms the housing of the planetary gear train 30, and a plurality of planetary gear sets 42, 44 and 46 that are received in the first ring gear 32 and the second ring gear 34. A first stage planetary gear set 42 is arranged inside the first ring gear 32. A second stage planetary gear set 44 and a third stage planetary gear set 46 are arranged inside the second ring gear 34. The first stage planetary gear set 42 comprises a first sun gear 422 and a plurality of first planetary gears 424 that mesh with the first sun gear 422. The first planetary gears 424 are respectively and rotatably mounted to first spigots 481 that extend from one side of a first carrier 482. The first planetary gears 424 can rotate along inner wall of the first ring gear 32 by meshing with the inner teeth of the first ring gear 32. The second stage planetary gear set 44 comprises a second sun gear 442 and a plurality of second planetary gears 444 that mesh with the second sun gear 442. The second planetary gears 444 are respectively and rotatably mounted to second spigots 483 that extend from one side of a second carrier 484. The third stage planetary gear set 46 comprises a third sun gear 462 and a plurality of third planetary gears 464 that mesh with the third sun gear 462. The third planetary gears 464 are respectively and rotatably mounted to third spigots 485 that extend from one side of a third carrier 486. The second planetary gears 444 and the third planetary gears 464 can rotate along the inner wall of the second ring gear 34 by meshing with the inner teeth of the second ring gear 34.

Figure 11:
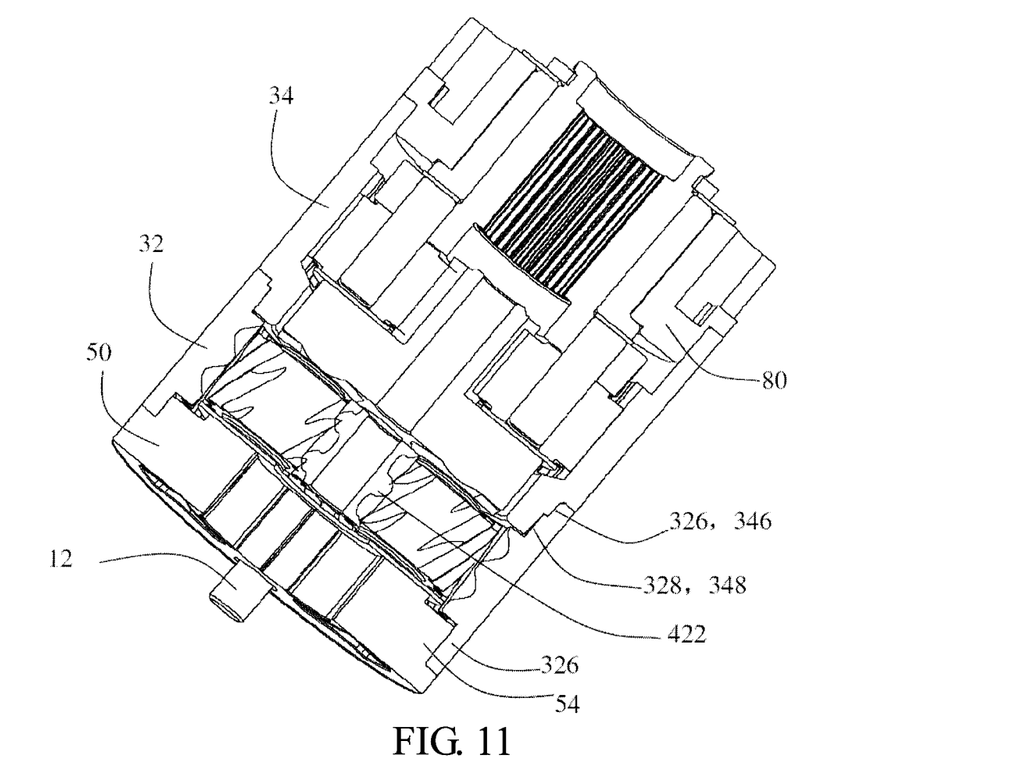
FIG. 11 is a sectional view of a planetary gear train of the drive unit of FIG. 8.
Figure 12:
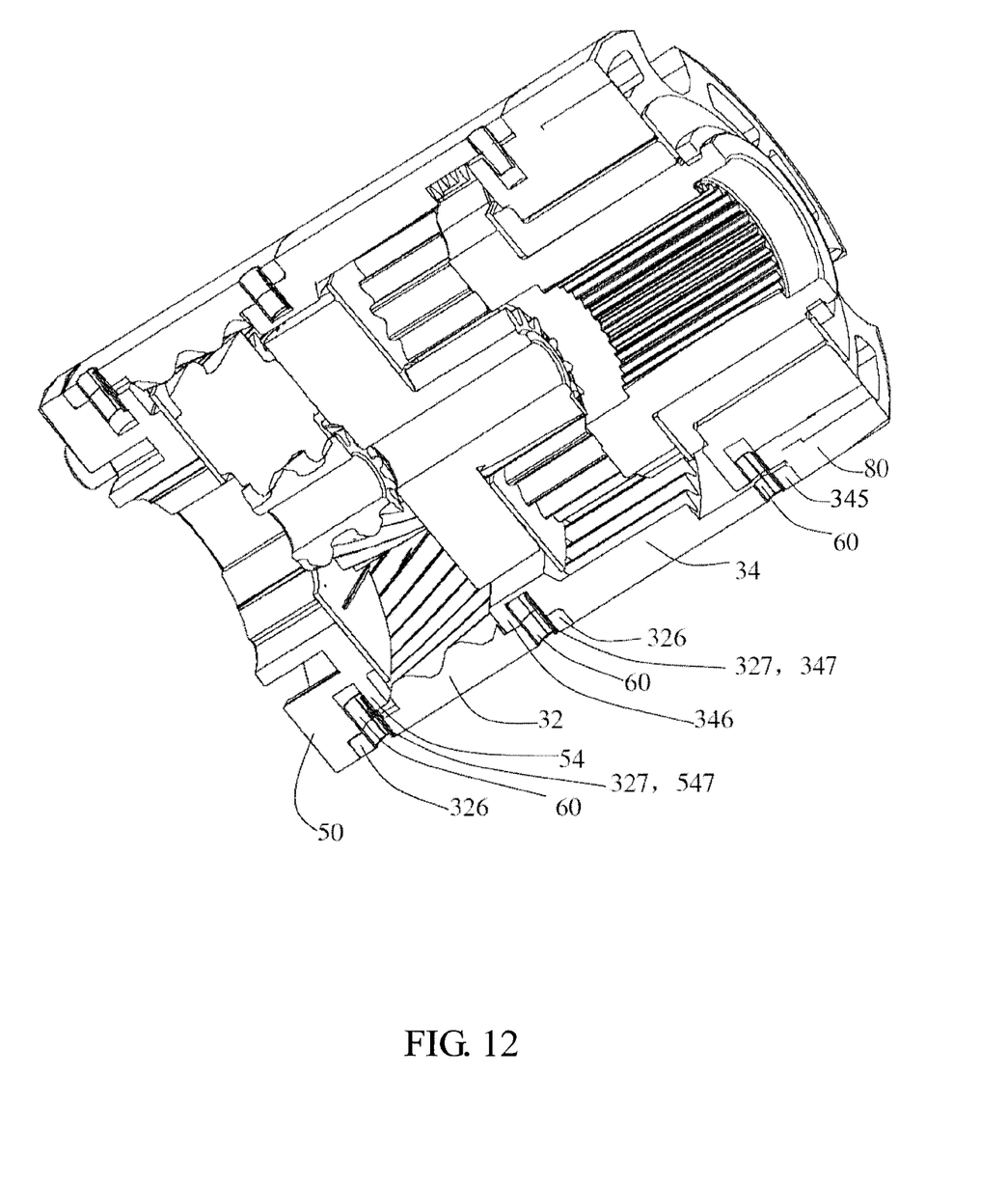
FIG. 12 is another sectional view of the planetary gear train of FIG. 11, viewed from a different angle.

The first stage planetary gear set 42 connects to a shaft 12 of the motor 10 (see FIG. 11). Specifically, the first sun gear 422 is fixed to the motor shaft 12 and rotates with the motor shaft 12. The second sun gear 442 is mounted to the other side of the first carrier 482 and rotates with the first carrier 482. The third sun gear 462 is mounted to the other side of the second carrier 484 and rotates with the second carrier 484. The drive unit further comprises an output shaft 70. One end of the output shaft 70 is fixed to the third carrier 486 and rotates with the third carrier, with the other end of the output shaft 70 to be connected to the load. As such, the rotational output of the motor 10 is transmitted to the output shaft 70 by the three planetary gear sets, and then the load is driven by the output shaft 70.

The first sun gear 422, the first ring gear 32 and the first planetary gears 424 are helical gears. Helical teeth 322 are formed on an inner surface of the first ring gear 32 to mesh with the helical teeth of the planetary gears 424. Due to the helical teeth, both the contact surface between the first sun gear 422 and the first planetary gears 424, and the contact surface between the first planetary gears 424 and the first ring gear 32 are increased. Therefore, the operation is stable and noise is lower. Preferably, the first planetary gears 424 (high rotational speed and low torque) are made of plastic to further decreased the noise. Usually, a ring gear having helical teeth form in inner surface is difficult to machine, but as the first ring gear 32 is made by sintered powder metallurgy, it is easy to manufacture and the cost is low.

Preferably, the second stage planetary gears 44, the third stage planetary gear set 46 and the second ring gear 34 are spur gears having straight teeth. The second planetary gears 444 and the third planetary gears 464, the carriers 482, 484 and 486, and the second ring gear 34 are made by sintered power metallurgy. The first sun gear 422 is made of metal. The second sun gear 442 and the first carrier 482 are integrally formed. The third sun gear 462 is made of metal and is mounted to the second carrier 484.

Figures 4, 5, 6:
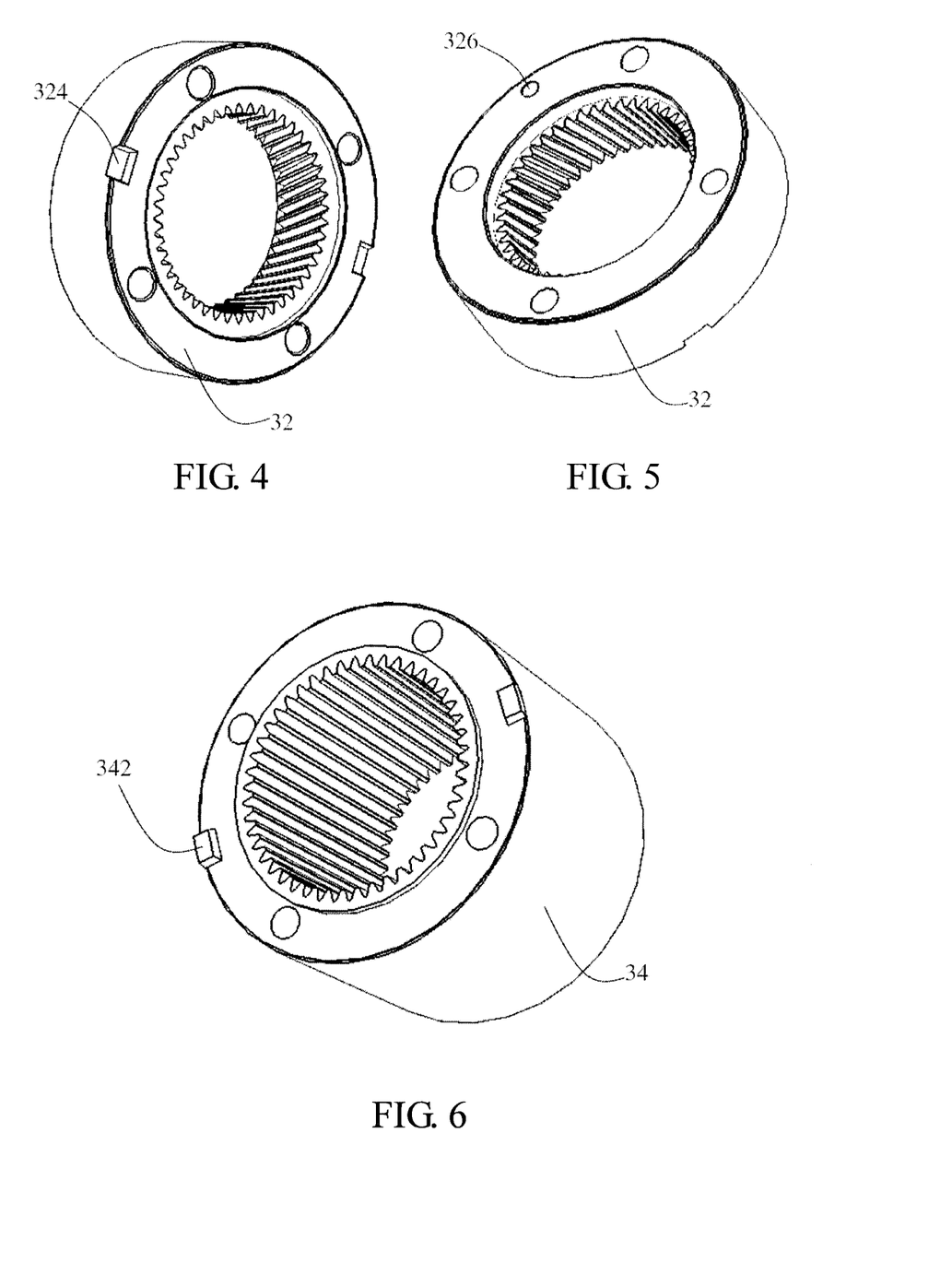
FIG. 4 illustrates a first ring gear of the planetary gear train of FIG. 3.
FIG. 5 shows the first ring gear of FIG. 4 viewed from another.
FIG. 6 illustrates a second ring gear of the planetary gear train of FIG. 3.

Quick aligning structures extending in an axial direction of the motor are configured between the first ring gear 32 and the second ring gear 34. Specifically, notches 324 are formed in the first ring gear 32 in the end connecting to the second ring gear 34. Bosses 342 are formed on the second ring gear 34 at the end connecting to the first ring gear 32. During assembling, the first ring gear 32 and the second ring gear 34 could be quickly aligned with each other by mating the notches 324 with the bosses 342.

Further quick aligning structures extending in an axial direction of the motor are also formed between the first ring gear 32 and the connecting piece 50. Specifically, notches 326 are formed in the first ring gear 32 at the end that is close to the connecting piece 50. Bosses 52 are formed on the connecting piece 50 at the end connecting to the first ring gear 32. During assembling, the first ring gear 32 and the connecting piece 50 may be quickly aligned with each other by mating the notches 326 and the bosses 52.

The drive unit further comprises a mounting piece 80 for holding a double or duplex bearing 82. A plurality of fasteners 84 such as bolts or screws, axially and subsequently pass through the mounting piece 80, the second ring gear 34, the first ring gear 32, and the connecting piece 50 to fasten them together. The output shaft 70 is supported by the duplex bearing 82. The connecting piece 50 is fixed to the motor end cap by additional fasteners such as screws (not shown).

Figure 7:
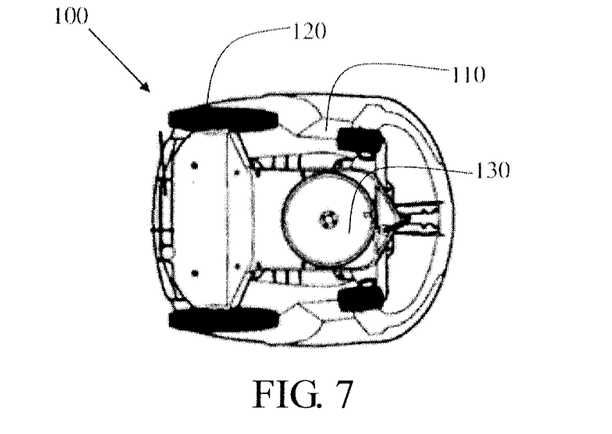
FIG. 7 schematically illustrates a mower equipped with the drive unit according to the first exemplary embodiment of the present invention.
Figure 8:
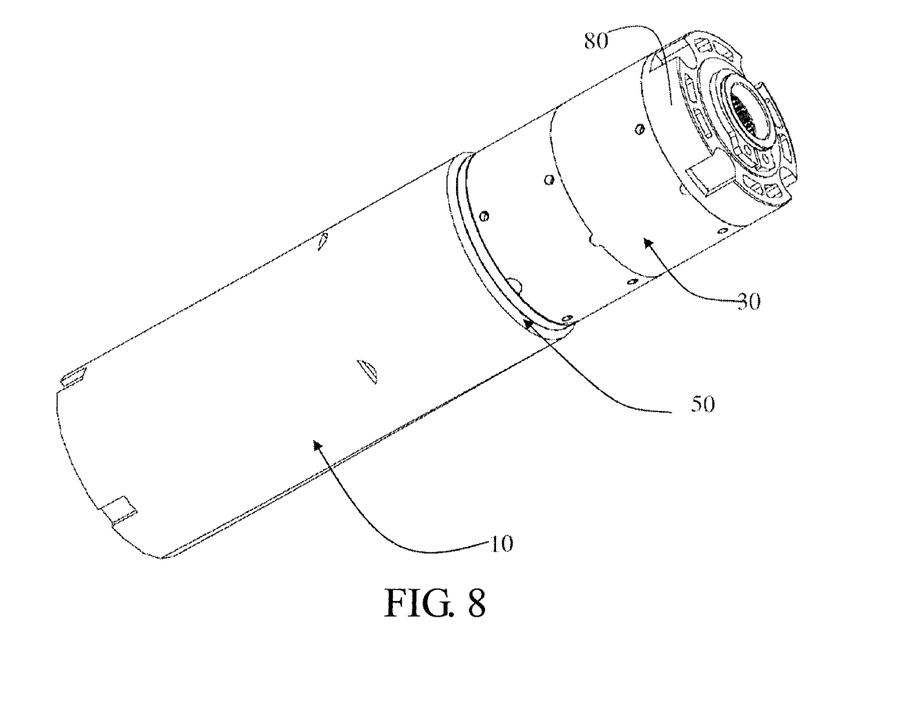
FIG. 8 illustrates a drive unit according to a second exemplary embodiment of the present invention.

FIG. 7 schematically illustrates a mower 100, viewed from below, equipped with the drive unit according to the first embodiment. The mower 100 comprises a main body 110, wheels 120 and cutting tools 130 are mounted to lower portion of the main body 110. The drive unit is mounted in the main body 110. The output shaft 70 of the drive unit directly or indirectly connects to at least one of the wheels 120 to drive the wheels 120 so that the mower 100 can he moved forwards or backwards.

FIG. 8 to FIG. 12 illustrates a drive unit according to second preferred embodiment of the present invention. The drive unit according to the second embodiment is different from that drive unit according to the first embodiment in that arc-shaped notches 324 are formed in both axial ends of the first ring gear 32 and arc-shaped bosses 52 and 342 that match the notches 324 are formed in the connecting piece 50 and the second ring gear 34. During assembling, the first ring gear 32 can be quickly aligned with the connecting piece 50 and the second ring gear 34 by matching the notches 324 and the bosses 52, 342. The notches 324 are arc-shaped so that it is easy to remove the first ring gear 32 from the mold. Two connecting rings 326 are formed at the axial ends of the first ring gear 32, respectively. The two connecting rings 326 surround a flange portion 54 of the connecting piece 50 and a flange portion 346 of the second ring gear 34, respectively.

Radially extending fitting holes 327, 547 and 327, 347 are formed in the connecting rings 326 and the flange portions 54, 346. Fastening pins 60 are radially pressed into the fitting holes to fasten the first ring gear 32 to the mounting piece 50 and the second ring gear 34. Another connecting ring 345 is formed in the second ring gear 34 at the end connecting to the mounting piece 80. The connecting ring 345 surrounds the flange portion 86 of the mounting piece 80, and is fixed to the flange portion of the mounting piece 80 by radial fastening pins 60.

Quick aligning structures extending in an axial direction of the motor are also formed between the second ring gear 34 and the connecting piece 80 (see FIG. 8 and FIG. 10), Specifically, notches 344 are formed in the end of the second ring gear 34 that connects to the connecting piece 80. Bosses (see FIG. 8) are formed in the connecting piece 80 at the end that is closed to the second ring gear 34. During assembling, the second ring gear 34 and the connecting piece 80 may be quickly aligned to each other by mating the notches 344 with the bosses in the connecting piece 80.

Figure 9:
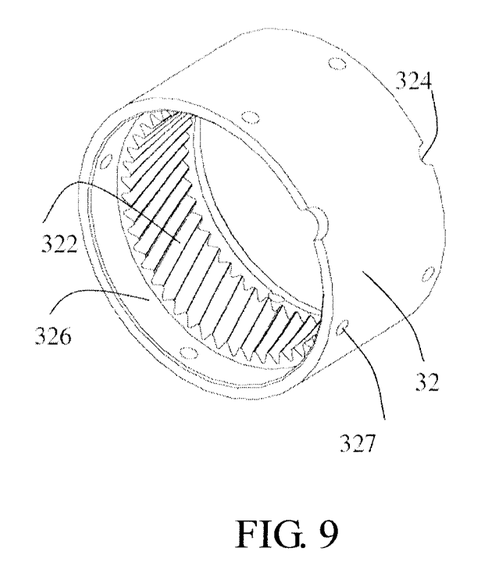
FIG. 9 illustrates a first ring gear of the drive unit of FIG. 8.
Figure 10:
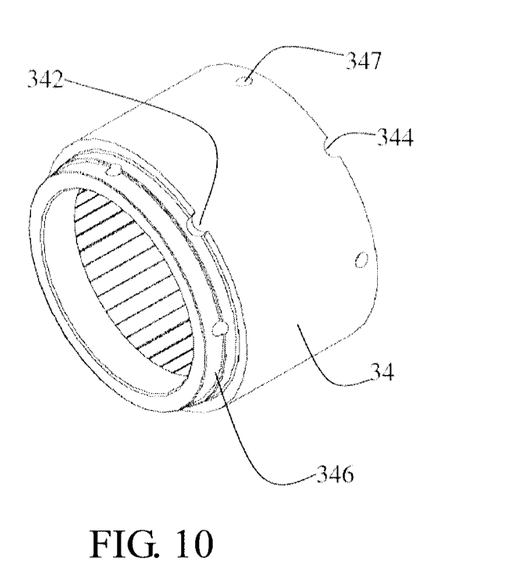
FIG. 10 illustrates a second ring gear of the drive unit of FIG. 8.

Preferably, the first ring gear 32 comprises an axial locating surface 328 formed in the inner surface of the connecting ring 326 that connects to the second ring gear 34. The locating surface 328 extends radially and inwardly from the inner surface of the connecting ring 326. Similarly, the second ring gear 34 comprises an axial locating surface 348 formed in the connecting ring 346 that connects to the first ring gear 32. The locating surface 328 is radially convex and the locating surface 348 is radially concave to mate with the locating surface 328 to ensure that the first ring gear 32 and the second ring gear 34 are coaxial.

The drive unit according to the aforesaid embodiments is particularly suited for use in powered lift gate assemblies in vehicles.

Figure 13:
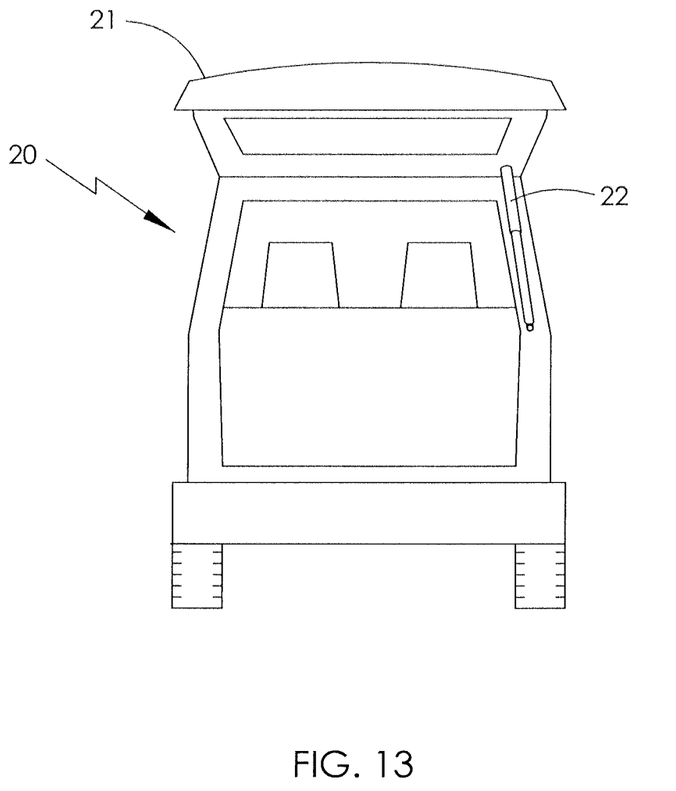
FIG. 13 is a schematic representation of a strut in a powered lift gate assembly of a passenger vehicle.

FIG. 13 illustrates a powered lift gate. assembly in a vehicle. The vehicle 20 has a rear, vertically opening door, known as a lift gate 21. The lift gate is opened and closed by a power strut 22. The strut 22 is electrically operated to open and close the lift gate by extending and contracting its axial length.

Figure 14:
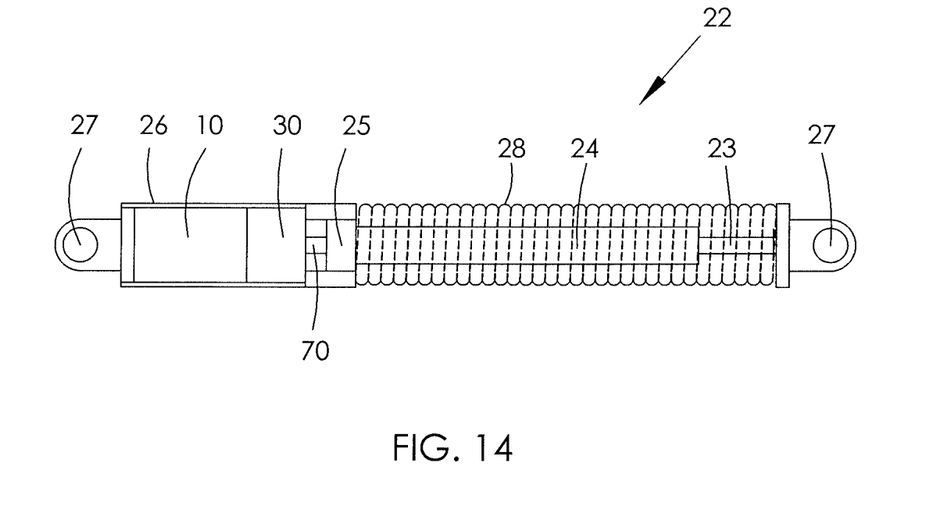
FIG. 14 is a sectional view of the strut of FIG. 13.

The strut is shown in more detail in FIG. 14. The strut 22 has a housing 26 accommodating a drive unit according to the present invention. The strut 22 is connected to the vehicle by mounts 27. The drive unit has a motor 10, driving an output shaft 70 through a gear reduction unit 30. The output shaft drives a runner 24 supported by a bearing 25. The runner has an internally threaded central hole which receives a threaded spindle 23 that is fixed to one of the mounts 27. A spring 28 urges the strut towards the fully extended position to help support the weight of the lift gate 21. In use, when the motor operates it turns the runner 24. As the spindle is unable to rotate because of the connection to the mount 27, the spindle is moved into or out of the runner due to the threaded connection there between, thus contracting or extending the strut 22 so as to lower or raise the lift gate 21.

Although the invention is described with reference to one or more preferred embodiments, it should he appreciated by those skilled in the art that various modifications are possible. Therefore, the scope of the invention is to be determined by reference to the claims that follow.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. A drive unit comprising:
   a motor having a motor shaft;
   an output; and
   a planetary gear train connecting the motor shaft to the output, comprising a first sun gear driven by the motor, a first ring gear, a first carrier, and a plurality of first planetary gears rotatably supported by and arranged at one side of the first carrier and meshing with the first sun gear and the first ring gear,
   wherein the first sun gear and the first planetary gears are helical gears having helical teeth and helical teeth are formed on an inner surface of the first ring gear and mesh with the helical teeth of the first planetary gears;
   wherein the planetary gear train comprises a second ring gear connected to the first ring gear, and quick aligning structure that extends in an axial direction of the motor is formed between the first and second ring gears;
   wherein the drive unit further comprises a connecting piece for fixing the planetary gear train to the motor, a mounting piece for holding a bearing; and a plurality of fasteners that passes through the mounting piece, the second ring gear, the first ring gear and the connecting piece to fasten them together.

2. The drive unit of claim 1, wherein the first ring gear is made by sintered powder metallurgy.

3. The drive unit of claim 1, wherein another quick aligning structure that extends in the axial direction of the motor is formed between the connecting piece and the first ring gear.

4. The drive unit of claim 1, wherein the first ring gear comprises notches formed in both axial ends of the first ring gear; and
   the connecting piece and the second ring gear have bosses that mate with the notches.

5. The drive unit of claim 1, wherein connecting rings are formed at both axial ends of the first ring gear;
   the connecting rings surround a flange portion of the connecting piece and a flange portion of the second ring gear respectively;
   radial fitting holes are formed in the connecting rings and the flange portions; and
   fasteners are respectively disposed in the corresponding fitting holes to fasten the first ring gear to the connecting piece and the second ring gear.

6. The drive unit of claim 1, wherein the first ring gear comprises a connecting ring formed in one end of the first ring gear;
   the second ring gear comprises a flange portion surrounded by the connecting ring;
   a radially convex axial locating surface is formed on one of the inner surface of the connecting ring and the flange portion; and
   a radially concave axial locating surface is formed on the other of the inner surface of the connecting ring and the flange portion, to mate with the convex axial locating surface.

7. A mower comprising:
   a main body;
   wheels and cutting tools arranged at a lower portion of the main body; and
   the drive unit of claim 1 mounted in the main body,
   wherein the output shaft is coupled to at least one of the wheels to drive the mower.

8. The mower of claim 7, wherein the planetary gear train comprises a second ring gear connected to the first ring gear, and
   a quick aligning structure that extends in the axial direction of the motor is formed between the first and second ring gears.

9. The mower of claim 8, further comprising a connecting piece for fixing the planetary gear train to the motor,
  wherein the first ring gear comprises notches formed in both axial ends of the first ring gear; and
  the connecting piece and the second ring gear have bosses that mate with the notches.

10. The mower of claim 8, further comprising a connecting piece for fixing the planetary gear train to the motor,
  wherein connecting rings are formed at both axial ends of the first ring gear;
  the connecting rings surround a flange portion of the connecting piece and a flange portion of the second ring gear respectively;
  radial fitting holes are formed in the connecting rings and the flange portions; and
  fasteners are respectively disposed in the corresponding fitting holes to fasten the first ring gear to the connecting piece and the second ring gear.

11. The mower of claim 8, wherein the first ring gear comprises a connecting ring formed in one end of the first ring gear;
  the second ring gear comprises a flange portion surrounded by the connecting ring;
  a radially convex axial locating surface is formed on one of the inner surface of the connecting ring and the flange portion; and
  a radially concave axial locating surface is formed on the other of the inner surface of the connecting ring and the flange portion, to mate with the convex axial locating surface.

12. A powered strut for operating a lift gate in a vehicle, comprising:
  the drive unit of claim 1;
  a housing accommodating the drive unit;
  mounts for fixing the strut to the vehicle;
  a runner rotatably mounted to the housing and driven by the output of e drive unit and having an internally threaded central hole;
  a spindle threadingly engaged with the central hole of the runner and fixed to one of the mounts and movable through the runner between a contracted position and an extended position, by rotation of the runner; and
  a spring urging the strut towards the extended position.

13. The powered strut of claim 12, wherein the planetary gear comprises a second ring gear connected to the first ring gear, and
  a quick aligning structure that extends in the axial direction of the motor is formed between the first and second ring gears.

14. The powered strut of claim 13, further comprising a connecting piece for fixing the planetary gear train to the motor,
  wherein the first ring gear comprises notches formed in both axial ends of the first ring gear; and
  the connecting piece and the second ring gear have bosses that mate with the notches.

15. The powered strut of claim 13, further comprising a connecting piece for fixing the planetary gear train to the motor,
  wherein connecting rings are formed at both axial ends of the first ring gear;
  the connecting rings surround a flange portion of the connecting piece and a flange portion of the second ring gear respectively;
  radial fitting holes are formed in the connecting rings and the flange portions; and
  fasteners are respectively disposed in the corresponding fitting holes to fasten the first ring gear to the connecting piece and the second ring gear.

16. The powered strut of claim 13, wherein the first ring gear comprises a connecting ring formed in one end of the first ring gear;
  the second ring gear comprises a flange portion surrounded by the connecting ring;
  a radially convex axial locating surface is formed on one of the inner surface of the connecting ring and the flange portion; and
  a radially concave axial locating surface is formed on the other of the inner surface of the connecting ring and the flange portion, to mate with the convex axial locating surface.

17. The powered strut of claim 12, wherein the first ring gear is made by sintered powder metallurgy.

18. A drive unit comprising:
  a motor having a motor shaft;
  an output; and
  a planetary gear train connecting the motor shaft to the output, comprising a first sun gear driven by the motor, a first ring gear, a first carrier, and a plurality of first planetary gears rotatably supported by and arranged at one side of the first carrier and meshing with the first sun gear and the first ring gear,
  wherein the first sun gear and the first planetary gears are helical gears having helical teeth and helical teeth are formed on an inner surface of the first ring gear and mesh with the helical teeth of the first planetary gears;
  wherein the planetary gear train comprises a second ring gear connected to the first ring gear, and a quick aligning structure that extends in an axial direction of the motor is formed between the first and second ring gears;
  wherein the drive unit further comprises a connecting piece for fixing the planetary gear train to the motor;
  wherein connecting rings are formed at both axial ends of the first ring gear;
  the connecting rings surround a flange portion of the connecting piece and a flange portion of the second ring gear respectively;
  radial fitting holes are formed in the connecting rings and the flange portions; and
  fasteners are respectively disposed in the corresponding fitting holes to fasten the first ring gear to the connecting piece and the second ring gear.

19. A drive unit comprising:
  a motor having a motor shaft;
  an output; and
  a planetary gear train connecting the motor shaft to the output, comprising a first sun gear driven by the motor, a first ring gear, a first carrier, and a plurality of first planetary gears rotatably supported by and arranged at one side of the first carrier and meshing with the first sun gear and the first ring gear,
  wherein the first sun gear and the first planetary gears are helical gears having helical teeth and helical teeth are formed on an inner surface of the first ring gear and mesh with the helical teeth of the first planetary gears;
  wherein the planetary gear train comprises a second ring gear connected to the first ring gear, and a quick aligning structure that extends in an axial direction of the motor is formed between the first and second ring gears;
  wherein the first ring gear comprises a connecting ring formed in one end of the first ring gear;
  the second ring gear comprises a flange portion surrounded by the connecting ring;

a radially convex axial locating surface is formed on one of the inner surface of the connecting ring and the flange portion; and a radially concave axial locating surface is formed on the other of the inner surface of the connecting ring and the flange portion, to mate with the convex axial locating surface.

\* \* \* \* \*